UNITED STATES PATENT OFFICE.

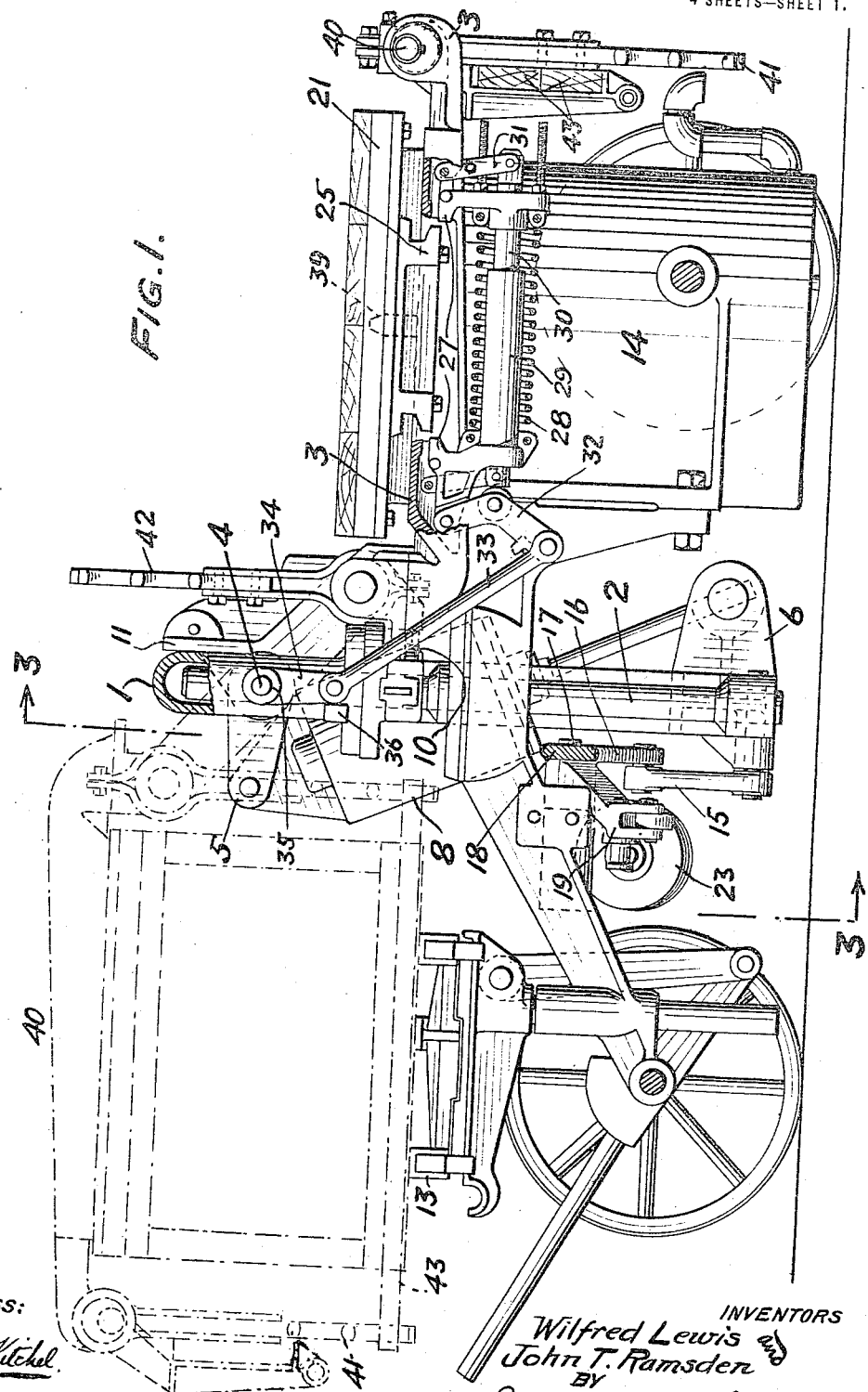

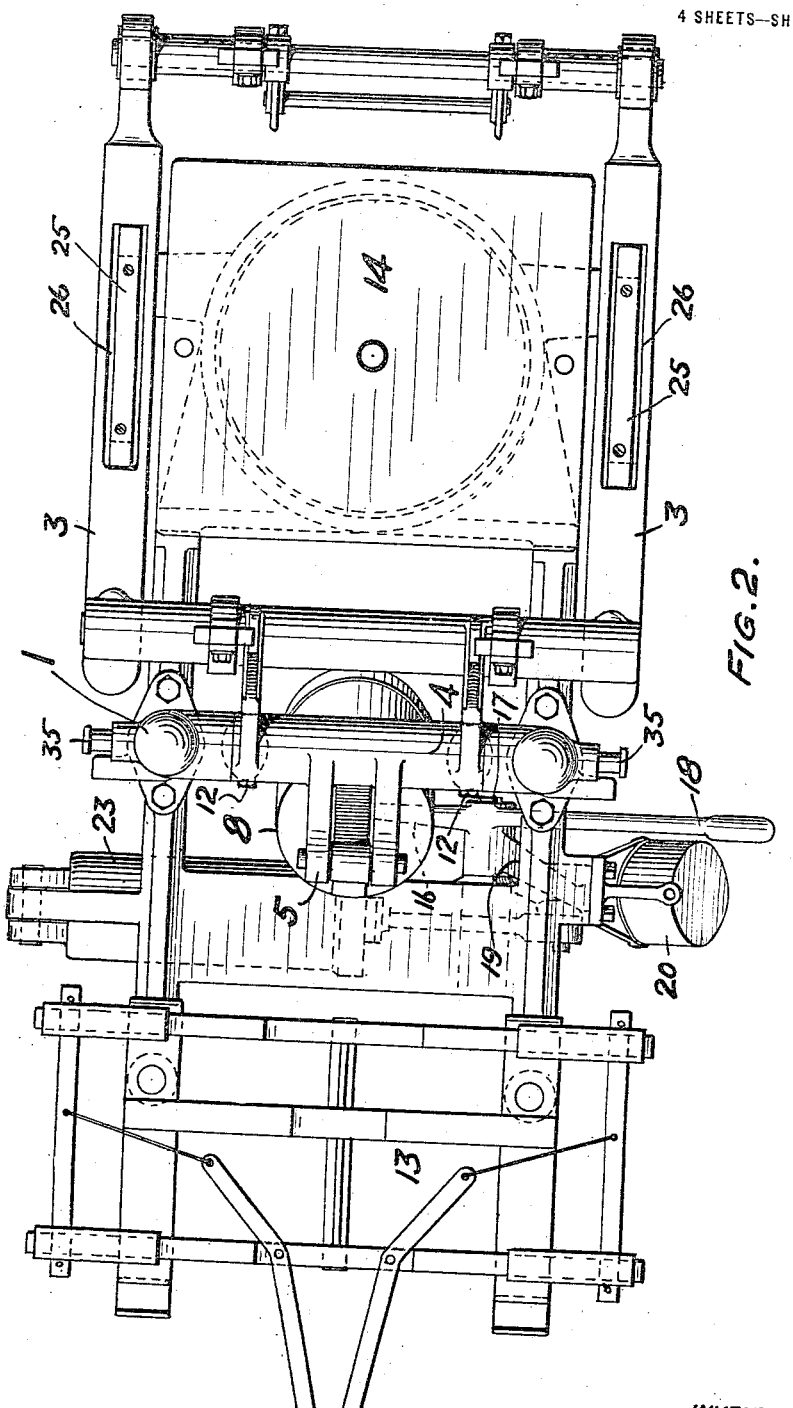

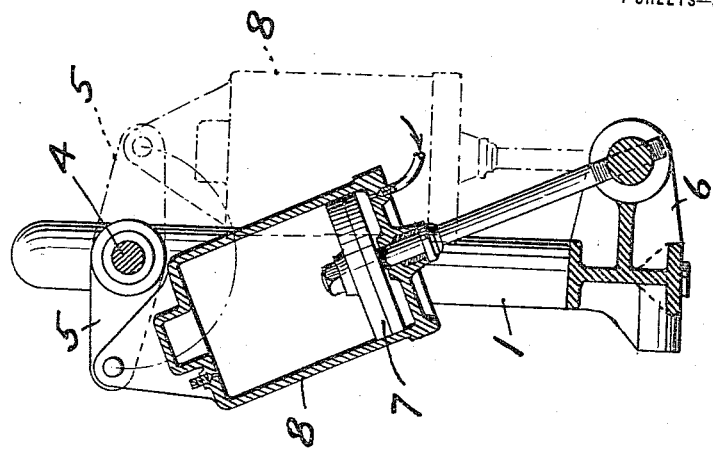
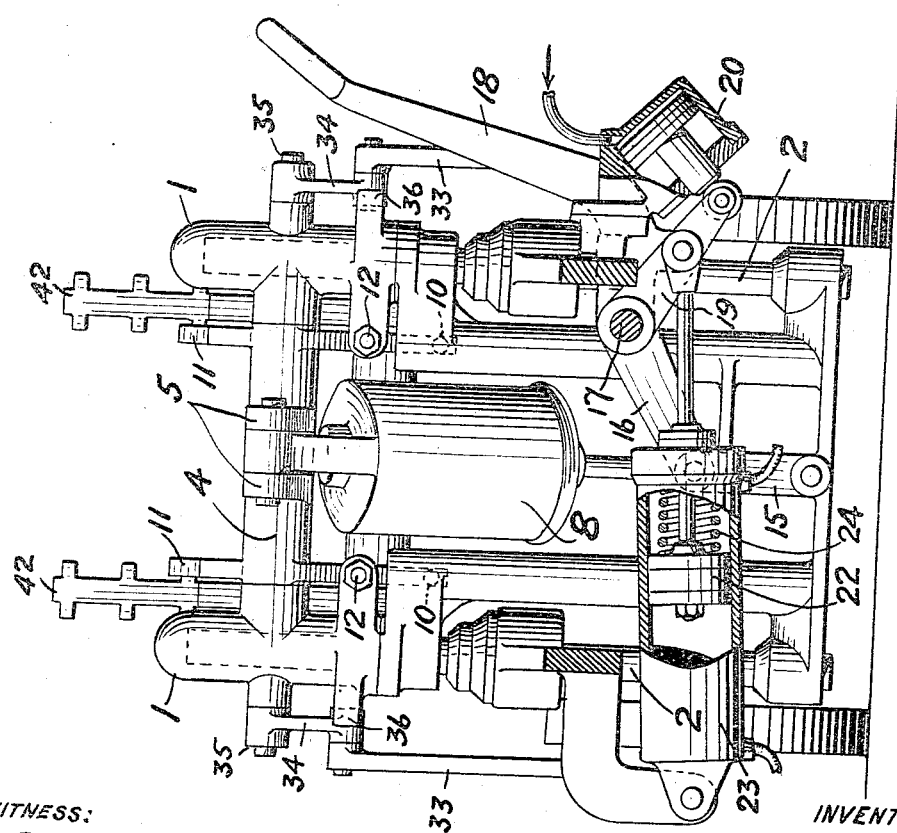

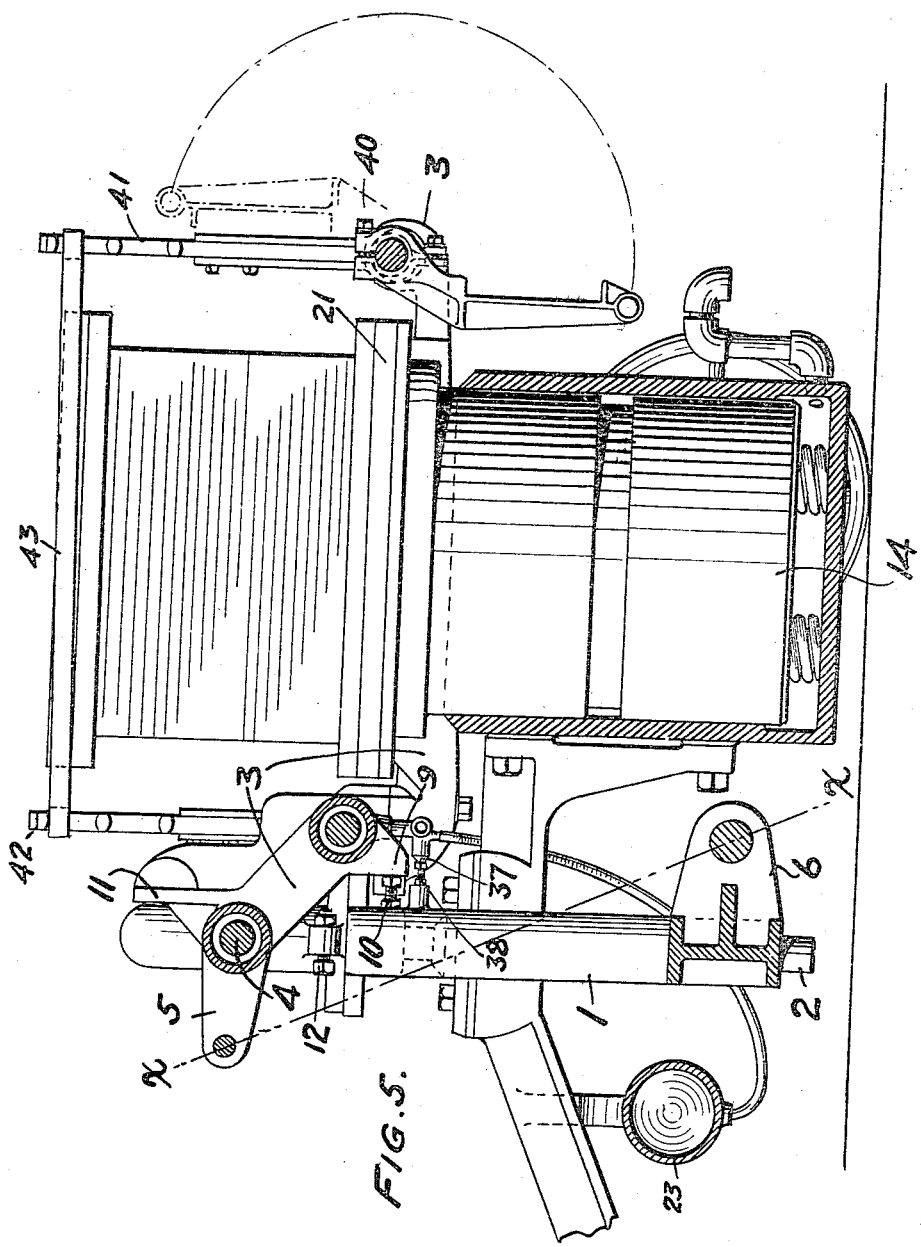

WILFRED LEWIS, OF HAVERFORD, AND JOHN T. RAMSDEN, OF PHILADELPHIA, PENNSYLVANIA, ASSIGNORS TO THE TABOR MANUFACTURING COMPANY, OF PHILADELPHIA, PENNSYLVANIA, A CORPORATION OF PENNSYLVANIA.

MOLDING-MACHINE.

1,245,114.     Specification of Letters Patent.     Patented Oct. 30, 1917.

Application filed April 10, 1917. Serial No. 160,920.

*To all whom it may concern:*

Be it known that we, WILFRED LEWIS and JOHN T. RAMSDEN, both citizens of the United States, and residents, respectively, of Haverford, in the county of Montgomery and State of Pennsylvania, and of Philadelphia, in the county of Philadelphia and State of Pennsylvania, have invented certain new and useful Improvements in Molding-Machines, of which the following is a specification.

The principal objects of the present invention are to provide a molding machine in which the power actuating mechanism and devices are so arranged and combined that certain of the operations of the machine are automatically separated or marked so that the machine can be successfully operated even by comparatively unskilled labor; to provide a power actuated roll-over pattern-lift molding machine with the advantages of shockless jarring mechanism; to provide against accidents which might happen if the machine were rolled over without proper fastening of the flask; to provide for properly controlling the operation of drawing a pattern by power; to provide improved automatic mechanism for connecting and disconnecting the roll-over arms and pattern plate; and to provide a molding machine which possesses the advantages of a power actuated roll-over pattern-lift machine and of shockless jarring mechanism and which at the same time can be operated even by comparatively unskilled labor.

The invention will be claimed at the end hereof but will be first described in connection with the embodiment of it selected for illustration in the accompanying drawings, in which—

Figure 1, is a side view, partly in section and with parts broken away, of a machine embodying features of the invention.

Fig. 2, is a top or plan view of the machine, with parts omitted.

Fig. 3, is a sectional view, taken on the line 3—3 of Fig. 1.

Fig 4, is a view, principally in section, illustrating a part of the roll-over mechanism, and Fig. 5, is a view, principally in central longitudinal section, illustrating a part of the machine.

The machine shown is of the power actuated roll-over pattern-lift type. 1, is the sliding frame arranged for vertical motion on standards 2. 3 are the roll-over arms and they are pivoted to the frame 1 as at 4 and are provided with prolongations 5. Between the prolongations 5 and fixed parts 6 of the machine is interposed a roll-over piston 7 and cylinder 8, Fig. 4, which shows in full and dotted lines two positions of the parts corresponding generally speaking with jarring and pattern drawing positions. In Fig. 5, the broken line X X indicates the center line of this piston and cylinder. The projection 9 and adjustable stop 10 position the arms 3 in respect to the frame 1 in what may be called jarring position, and the projection 11 and stop 12 position the arms in respect to the frame in what may be called pattern drawing position. 13 is a flask support shown as of the adjustable variety and it is arranged at one side of the sliding frame 1. 14 is shockless jarring mechanism and it is arranged at the other side of the sliding frame 1. This mechanism and support are well understood by those skilled in the art and need not be described in detail.

The sliding frame 1, Fig. 3, is connected by means of a link 15 with an arm 16 on a rock-shaft 17 which is provided with a hand lever 18 and with an arm 19. 20 is a lifting piston and cylinder adapted to operate upon the arm 19 and as shown it is of short stroke and of sufficient power to lift the sliding frame 1, the arms 3 and everything carried by them including the pattern plate 21, and the flask and its contents of sand. The lifting piston 22 and cylinder 23 operate upon the arm 19 and as shown have a comparatively long stroke, but need have only sufficient power to lift the sliding frame 1, arms 3 and parts carried thereby including the pattern plate, but excluding the flask and its contents. 24, is a compression spring and its purpose is to counterbalance the frame 1 and the arms 3 and parts carried thereby, which may include the pattern plate 21 but not the flask. The pattern plate 21 is detachable from the arms 3 and is provided with reversely disposed depending keepers 25 which are adapted to enter openings 26 (Fig. 2) in the arms 3. 27 are catches closed by a tension spring 28 and having telescopic stems 29 and 30, of which one 30, is provided with a pivotal link 31 pivotally connected to one of the arms 3. 32 is a lever pivoted at one end to the stem 29 and it operates upon the stem 30 to open the catches. The free end of the lever 32 is connected by a link 33 with a crank-arm 34, loosely pivoted to the sliding frame 1 as by a pivot 35 concentric with the axis of the arms 3. 36 is a stop on the sliding frame which coöperates with the crank-arm 34. It will be understood that each arm is equipped with the catch mechanism that has been just described.

In describing the mode of operation of the machine it will be assumed that the arms 3 are rolling over toward the right in Fig. 1 and have the pattern carrier 21 clamped to them and that the frame 1 is lifted to the extent that the full stroke of the lifting piston and cylinder 20 can lift it. As the arms 3 approach a horizontal position the crank-arm 34 abuts on its stop 36 with the result that the catches 27 are pushed apart and free the keepers 25 thus detaching the pattern plate from the arms. This same turning motion causes a valve 37, carried by the arms, to strike an adjustable abutment 38 on the frame and to be thereby opened, admitting air to the drawing cylinder 23 in opposition to the spring 24. The spring 24 is thus overcome so that the frame 1, and with it the arms 3 in horizontal position, drop into the position shown in Fig. 1. In this way the pattern plate is deposited on the top or table of the shockless jarring mechanism. As shown in Fig. 1, the pattern plate is positioned by a dowel-pin 39, the flask is applied to the pattern plate and the mold is rammed by the well understood operation of the shockless jarring mechanism. Upon the completion of the mold air is admitted to the lifting cylinder 20 which lifts the frame 1 and the arms 3 and the pattern plate and the flask and its contents for a short distance, say a few inches above the top of the shockless jarring mechanism, or at any rate, sufficiently to clear the dowel-pin 39, and then holds them in a position of rest. During this lifting movement the catches 27 come into line with the keepers 25 and the pause or rest calls attention to the necessity of clamping the flask to the arms 3 and gives an opportunity for performing that operation. A comparatively unskilled operator having operated the piston 20 observes the described elevation of the parts into a position of rest and thus has impressed upon his mind the necessity for clamping the flask. Of course the flask can be clamped by a variety of mechanism, but we have illustrated at 40 one type of clamping mechanism and it forms the subject-matter of an application, serially numbered 160,907 filed by the aforesaid Wilfred Lewis. Generally speaking it consists of standards 41 and 42 between which the planks 43 are arranged so as to clamp the flask and its bottom board to the arms 3. Incidentally it may be said that at the right-hand side of Fig. 1, one of the standards is shown as turned down out of the way and the planks are shown as arranged behind it. After the flask has been clamped to the arms and while the latter and the frame 1 are held in elevated position by the piston and cylinder 20, the operator actuates the piston and cylinder 7 and 8, with the result that the arms are rolled-over into the general position shown by dotted lines in Fig. 1. At the beginning of the turning movement the valve 37 is automatically operated to release pressure on the piston 22 back of the spring 24 which comes into play exerting a lifting tendency on the arms 3, and the spring 28 being released draws the catches 27 together into engagement with the keepers 25. After the flask is in the position shown by dotted lines at the left-hand side of Fig. 1 the lifting piston and cylinder 20 are operated so as to lower the flask onto the flask support 13 which is properly leveled up to it. The operator then unclamps the flask from its carrier and admits pressure to the piston of the cylinder 20 and to the piston 22 in their respective cylinders, the latter of which has sufficient stroke and power to continue the lifting of the frame 1, the arms 3 and the pattern plate so as to draw the pattern. During this pattern drawing, the operation of the pistons can be assisted or steadied by means of the hand lever 18, which is sometimes a matter of convenience and importance. Catches and keepers 25 and 27 are quite sufficient for the lifting of the pattern and pattern plate, but in some cases it is not safe to rely upon them during the roll-over operation and for that reason use is made of the clamping mechanism 40. The described operations are then repeated in the making of additional molds.

It will be obvious to those skilled in the art to which the invention relates that modifications can be made in details of construction and arrangement and that some of the features can be employed without others, without departing from the spirit of the invention which we do not intend to limit in those respects or otherwise than as the appended claims and the prior state of the art may require.

What we claim is:

1. In a molding machine the combination of shockless jarring mechanism, a counter-balanced sliding frame, roll-over arms provided with a detachable pattern plate and positionable in respect to the frame, a piston and cylinder adapted to oppose the counter-balance of the frame to depress the arms below the jarring mechanism and leave the pattern plate thereon, and valve mechanism for said cylinder operatable by turning movement of the arms.

2. In a molding machine the combination of a frame, roll-over arms pivoted to the frame, spring closed catches having telescopic stems of which one is provided with pivotal links pivotally connected with an arm, a lever operating upon the other stem to open the catches, a crank arm pivoted to the frame and provided with a link connected with the lever, and a crank arm stop, substantially as described.

3. In a molding machine the combination of a frame, roll-over arms pivoted to the frame and positionable in pattern drawing position, a cylinder and piston adapted to lift the frame to draw the pattern, and a hand lever linked to the frame and affording means for steadying its pattern drawing movement.

4. In a molding machine the combination of a shockless jarring mechanism, a vertically slidable frame having roll-over arms positionable horizontally in respect thereto, fastenings for securing a flask to the arms, and means for imparting a limited range of lift to said frame and arms and to provide a dwell for operating the mold fastenings prior to rolling over.

5. In a molding machine the combination of a sliding frame, roll-over arms positionable in mold making and pattern drawing positions in respect to the frame, a pattern carried by the arms, a roll-over piston and cylinder interposed between the frame and arms, and a pair of pistons and cylinders whereof one operates to actuate the frame and lift the flask and whereof the other operates to draw the pattern.

6. In a molding machine the combination of shockless jarring mechanism, a mold support, a vertically movable frame interposed between said support and mechanism, roll-over arms pivoted to the frame and positionable in pattern drawing and jarring positions, a rock-over piston and cylinder between the arms and frame, and a pair of pistons and cylinders whereof one is of relatively short stroke and operates to lift the frame and whereof the other is of relatively long stroke and operates to draw the pattern.

7. In a molding machine the combination of shockless jarring mechanism, a mold support, a vertically movable frame interposed between said support and mechanism, roll-over arms pivoted to the frame and positionable in pattern drawing and jarring positions, a rock-over piston and cylinder between the arms and frame, a pair of pistons and cylinders whereof one is of relatively short stroke and operates to lift the frame and whereof the other is of relatively long stroke and operates to draw the pattern, and a hand lever linked to the frame to steady the operation of the piston and cylinder of long stroke.

8. In a molding machine the combination of a sliding frame provided with roll-over arms, mechanism for lifting the frame and holding it at rest, and means independent of the lifting mechanism for rolling over the arms after the frame has been raised and while it is at rest.

9. In a molding machine the combination of shockless jarring mechanism, a slidable frame provided with pivotal roll-over arms and with means for holding them in a horizontal position, a pattern plate detachably connected with the arms, and means responsive to turning movement of the arms for automatically lowering the frame and arms after the plate has been deposited on said mechanism.

10. In a molding machine the combination of a frame and its roll-over arms, a piston and cylinder for raising and lowering the frame, a balancing spring, and a valve and its connections adapted to operate the piston in opposition to the spring and operatable by the arms at the completion of their turning movement.

WILFRED LEWIS.
JOHN T. RAMSDEN.

Copies of this patent may be obtained for five cents each, by addressing the "Commissioner of Patents, Washington, D. C."